E. PETTEYS.
Draft Equalizers.
No. 100,187. Patented Feb. 22, 1870.
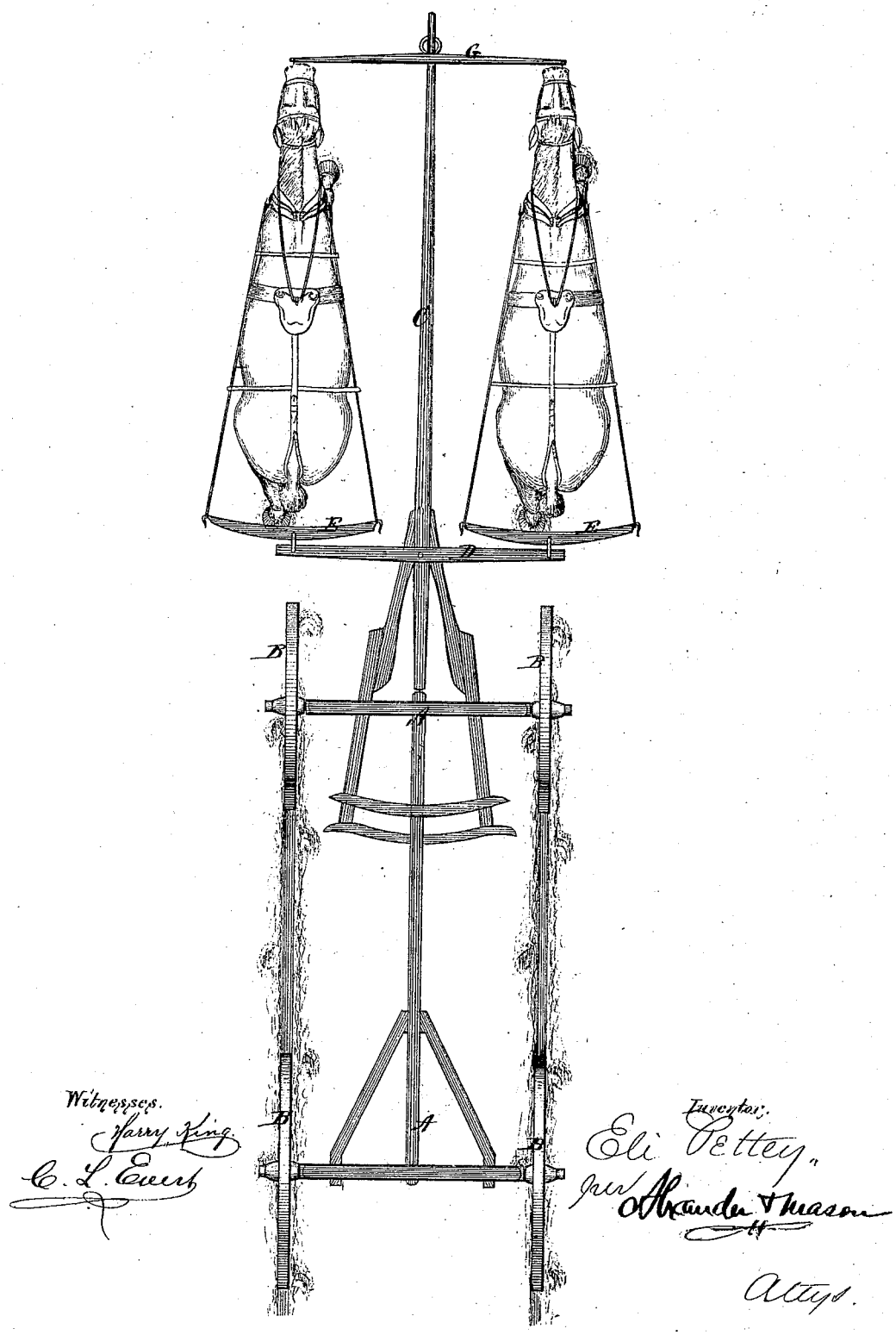

United States Patent Office.

ELI PETTEYS, OF CHESTERTOWN, NEW YORK.

Letters Patent No. 100,187, dated February 22, 1870.

IMPROVEMENT IN WAGONS.

The Schedule referred to in these Letters Patent and making part of the same.

*To all whom it may concern:*

Be it known that I, ELI PETTEYS, of Chestertown, Warren county, and in the State of New York, have invented certain new and useful Improvements in Wagons; and do hereby declare that the following is a full, clear, and exact description thereof, reference being had to the accompanying drawings and to the letters of reference marked thereon, making a part of this specification.

It is well known that our common wagon-roads in wet weather become very badly rutted and cut up by the wagon-wheels, for the reason that when the roads are muddy, the horses always travel in the same path that the previous horses had just made, and as the horses travel about three feet apart, from center to center, and the wagon-tracks four or five feet, the result is each one makes its own track; that is, when the horses go in the same horses' part, the wagon-wheels must go in the same old wagon-track, and consequently the ruts become very deep.

The object of my invention is to obviate this difficulty, and consists in placing the horses the same distance apart that the wagon-wheels are, and then the wheels will follow each horse.

In order to enable others skilled in the art to which my invention appertains, to make and use the same, I will now proceed to describe its construction and operation, referring to the annexed drawings which represent a wagon-frame with double team attached.

A represents the wagon-frame, mounted upon the wheels B B. Upon the tongue C is the double-tree D, at the ends of which are the single-trees E E. The horses being suitably hitched to the wagon, they are held at the proper distance apart at their heads by a neck-yoke, G.

The double-tree D and neck-yoke G are made of the exact length that the wheels of the wagon are apart, so that the wheels will follow in the same track made by the horses.

When this is the case, there can be no ruts formed, for the reason that when one wagon passes over the road and makes some ruts, the next team that passes over cannot be made to walk in the rut, and of course the wagon has to make a new track, and so on with the next and next, and the road wears down smooth, as though it was paved.

Having thus fully described my invention,

What I claim as new, and desire to secure by Letters Patent, is—

1. So connecting the double-tree of a wagon that the points of attachment of the whiffletrees shall be in line with the wheels, in a four-wheeled vehicle, as and for the purpose set forth.

2. The arrangement of a neck-yoke with a double-tree of the same length, when the two are so connected that the draft of the wagon will of necessity be in direct line with the wheels of the same, as and for the purpose specified.

In testimony that I claim the foregoing I have hereunto set my hand this 15th day of December, 1869.

ELI PETTEYS.

Witnesses:
J. H. WALKER,
S. J. WILLIAMS.